United States Patent [19]

Bitterli

[11] Patent Number: 5,123,930
[45] Date of Patent: Jun. 23, 1992

[54] 1:2 CHROMIUM AND COBALT COMPLEXES OF MONOAZO COMPOUNDS FOR DYING POROUS OXIDE LAYERS ON ALUMINUM AND ALUMINUM ALLOY SUBSTRATES

[75] Inventor: Peter Bitterli, Reinach, Switzerland
[73] Assignee: Sandoz Ltd., Basel, Switzerland
[21] Appl. No.: 570,940
[22] Filed: Aug. 21, 1990

Related U.S. Application Data

[60] Continuation of Ser. No. 438,144, Nov. 16, 1989, abandoned, which is a continuation of Ser. No. 259,933, Oct. 19, 1988, abandoned, which is a continuation of Ser. No. 931,752, Nov. 17, 1986, abandoned, which is a division of Ser. No. 727,560, Apr. 26, 1985, abandoned.

[30] Foreign Application Priority Data

Apr. 27, 1984 [DE] Fed. Rep. of Germany ....... 3415667

[51] Int. Cl.$^5$ .................. C23C 22/26; C09B 45/14; D06P 1/10; D06P 3/24
[52] U.S. Cl. .................................. 8/522; 8/437; 8/527; 8/681; 8/685; 534/696; 534/721; 534/723
[58] Field of Search ............... 534/721, 723, 696, 725; 8/522

[56] References Cited

U.S. PATENT DOCUMENTS

| | | | |
|---|---|---|---|
| 1,833,237 | 11/1931 | Straub et al. | 534/725 |
| 1,865,978 | 1/1932 | Straub et al. | 534/725 |
| 1,888,516 | 11/1932 | Straub et al. | 534/725 |
| 1,925,434 | 4/1933 | Clingestein et al. | 534/721 X |
| 2,074,225 | 3/1937 | Krebser | 534/721 X |
| 2,128,325 | 8/1938 | Rose | 534/721 |
| 2,268,936 | 1/1942 | Hasler et al. | 534/723 |
| 2,276,174 | 3/1942 | Fleischhauer | 534/721 X |
| 2,804,454 | 8/1957 | Beffa | 534/721 |
| 4,051,116 | 9/1977 | Dore | 534/725 X |
| 4,155,903 | 5/1979 | Dore | 534/725 X |
| 4,416,816 | 11/1983 | Grossmann | 534/725 X |
| 4,710,198 | 12/1987 | Beffa et al. | 8/437 |

FOREIGN PATENT DOCUMENTS

| | | | |
|---|---|---|---|
| 1272728 | 8/1961 | France | 534/721 |
| 49-86501 | 8/1974 | Japan | 534/725 |
| 51-129495 | 11/1976 | Japan | 534/725 |
| 55-60562 | 5/1980 | Japan | 534/725 |
| 55-97492 | 7/1980 | Japan | 534/725 |
| 57-53565 | 3/1982 | Japan | 534/725 |
| 57-73052 | 11/1982 | Japan | 534/721 |
| 130837 | 3/1929 | Switzerland | 534/721 |
| 131503 | 5/1929 | Switzerland | 534/721 |
| 203140 | 5/1939 | Switzerland | 534/721 |
| 211927 | 1/1941 | Switzerland | 534/721 |
| 230197 | 3/1944 | Switzerland | 534/721 |
| 353411 | 7/1931 | United Kingdom | 534/721 |
| 457525 | 11/1936 | United Kingdom | 534/721 |
| 459949 | 1/1937 | United Kingdom | 534/721 |
| 1420258 | 1/1976 | United Kingdom | 534/602 |
| 995875 | 6/1985 | United Kingdom | |

OTHER PUBLICATIONS

Price, *The Chemistry of the Synthetic Dyes*, vol. III, Venkataraman, ed., Academic Press, New York (1970), pp. 303-304 and 334-341.

Primary Examiner—Mary C. Lee
Assistant Examiner—Fiona T. Powers
Attorney, Agent, or Firm—Gerald D. Sharkin; Richard E. Vila; Melvyn M. Kassenoff

[57] ABSTRACT

1:2 metal complexes of the formula

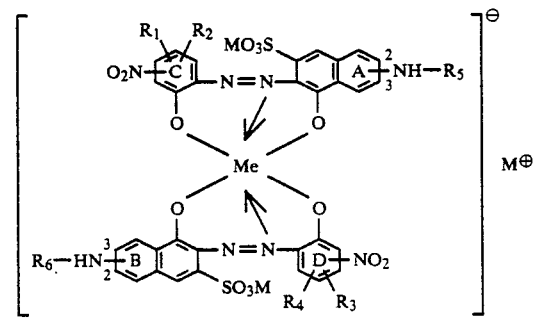

wherein
each of $R_1$ and $R_3$ is independently hydrogen or nitro, with the proviso that when a ring has two nitro groups, they are meta to each other,
each of $R_2$ and $R_4$ is independently hydrogen, chloro or $-SO_3M$,
each of $R_5$ and $R_6$ is independently hydrogen, $-COR_7$, $-CONHR_8$ or $-SO_2R_9$,
wherein
$R_7$ is $C_{1-6}$alkyl, $C_{1-6}$alkoxy, phenyl($C_{1-4}$-alkyl) or phenyl ($C_{1-4}$alkyl) the phenyl group of which is substituted by 1 or 2 substituents selected from halo, $C_{1-4}$-alkyl, $C_{1-4}$alkoxy, nitro, amino, $-COOM$, $-SO_3M$ and acetamido,
$R_8$ is hydrogen; $C_{1-6}$alkyl; phenyl; phenyl substituted by 1 or 2 substituents selected from halo, $C_{1-4}$alkyl, $C_{1-4}$alkoxy, nitro, amino, $-COOM$, $-SO_3M$ and acetamido; naphthyl or naphthyl monosubstituted by chloro, amino, phenylamino, acetamido, benzamido or $-SO_3M$, and
$R_9$ is $C_{1-6}$alkyl, phenyl or phenyl substituted by 1 or 2 substituents selected from halo, $C_{1-4}$alkyl, $C_{1-4}$alkoxy, nitro, amino, $-COOM$, $-SO_3M$ and acetamido, and
Me is chromium or cobalt, wherein each M and $M^\oplus$ is independently hydrogen or a non-chromophoric cation, with the provisos that (1) when both $R_5$ and $R_6$ are hydrogen, both $R_1$ and $R_3$ are hydrogen and at least one of $R_2$ and $R_4$ is chloro, and (2) the $-NHR_5$ group is in the 2- or 3-position of Ring A and the $-NHR_6$ group is in the 2- or 3-position of Ring B, and mixtures thereof, are useful as dyes for dyeing or printing various materials, such as natural and synthetic polyamides and particularly for dyeing artificially produced oxide layers on aluminum or aluminum alloys.

21 Claims, No Drawings

1:2 CHROMIUM AND COBALT COMPLEXES OF MONOAZO COMPOUNDS FOR DRYING POROUS OXIDE LAYERS ON ALUMINUM AND ALUMINUM ALLOY SUBSTRATES

This is a continuation of application Ser. No. 07/438,144, filed Nov. 16, 1989 and now abandoned, which is a continuation of application Ser. No. 07/259,933, filed Oct. 19, 1988 and now abandoned, which in turn is a continuation of application Ser. No. 06/931,752, filed Nov. 17, 1986 and now abandoned, which in turn is a division of application Ser. No. 06/727,560, filed Apr. 26, 1985 and now abandoned.

The invention relates to 1:2 metal complex azo compounds containing sulphonic acid groups, their preparation and their use as anionic dyestuffs.

According to the invention there is provided 1:2 metal complex as of formula I

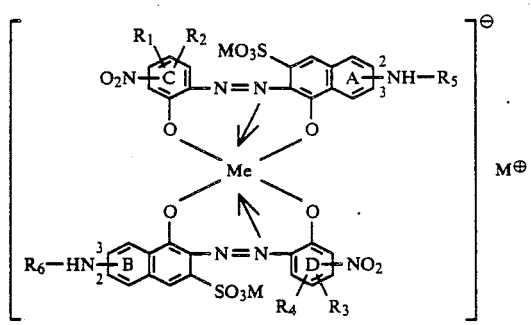

in which
  Me is chromium or cobalt,
  each M, independently, is hydrogen or an equivalent of any non-chromophoric cation,
  each of $R_1$ and $R_3$, independently, is hydrogen or nitro, with the proviso that any nitro group is meta to the nitro group already present on the same ring,
  each of $R_2$ and $R_4$, independently, is hydrogen, chlorine or $-SO_3M$,
  each of $R_5$ and $R_6$, independently, is hydrogen, $-COR_7$, $-CONHR_8$ or $-SO_2R_9$, provided that when $R_5$ and $R_6$ are both hydrogen, then $R_1$ and $R_3$ are both hydrogen and at least one of $R_2$ and $R_4$ is chlorine, $R_7$ is $C_{1-6}$alkyl, $C_{1-6}$alkoxy or phenyl ($C_{1-4}$-alkyl) in which the phenyl group is unsubstituted or substituted by one or two groups selected from halogen, $C_{1-4}$alkyl, $C_{1-4}$alkoxy, nitro, amino, $-COOM$, $-SO_3M$ and acetamido,
  $R_8$ is hydrogen; $C_{1-6}$alkyl; phenyl; phenyl substituted by one or two groups selected from halogen, $C_{1-4}$alkyl, $C_{1-4}$alkoxy, nitro, amino, $-COOM$, $-SO_3M$ and acetamido; naphthyl or naphthyl monosubstituted by chlorine, amino, phenylamino, acetamido, benzoylamino or $-SO_3M$,
  $R_9$ is $C_{1-6}$alkyl, phenyl or phenyl substituted by one or two groups selected from halogen, $C_{1-4}$alkyl, $C_{1-4}$alkoxy, nitro, amino, $-COOM$, $-SO_3M$ and acetamido,
  provided that each of $-NHR_5$ and $-NHR_6$, independently, is bound in the 2- or 3-position of rings A and B, respectively, and mixtures thereof, which complexes are in free acid or salt form.

In the specification any alkyl, the alkyl moiety of any phenyl-substituted alkyl group or the alkyl group of any alkoxy group is linear or branched unless otherwise stated.

Any halogen a phenyl substituent is preferably chlorine or bromine, more preferably chlorine.

The substituents of phenyl rings C and D and their positions on them may be the same or different for each of rings C and D; preferably they are the same, i.e., $R_1$ and $R_3$, $R_2$ and $R_4$ and their positions on the phenyl rings C and D including the position of the nitro group already present on the same ring are identical.

Furthermore, $R_5$ and $R_6$ may be the same or different; preferably they are identical groups. The position of $-NHR_5$ on ring A may be the same as or different from that of $-NHR_6$ on ring B. Particularly preferred is the 3-position on rings A and B for each of $-NHR_5$ and $-NHR_6$.

Most preferred are 1:2 chromium complexes of formula I.

$R_2$ and $R_4$ are most preferably hydrogen.

Any alkyl or alkoxy as $R_7$ preferably contains 1 to 4 carbon atoms; more preferably it has 1 or 2 carbon atoms; any alkyl in a phenylalkyl group preferably contains 1 to 3 carbon atoms, more preferably 1 or 2 carbon atoms.

Any alkyl as $R_8$ or $R_9$ is preferably a $C_{1-4}$alkyl group, especially methyl or ethyl.

$R_7$ is preferably $R_{7a}$, where $R_{7a}$ is $C_{1-4}$alkyl, $C_{1-4}$alkoxy or phenyl ($C_{1-3}$-alkyl), in which the phenyl group is unsubstituted or substituted by one or two groups selected from chlorine, methyl, methoxy, $-COOM$ and $-SO_3M$. More preferably, it is $R_{7b}$, where $R_{7b}$ is $C_{1-2}$alkyl, $C_{1-2}$alkoxy or phenyl ($C_{1-2}$alkyl), in which the phenyl group is unsubstituted or monosubstituted by chlorine, methyl or methoxy. More preferably, it is $R_{7c}$, where $R_{7c}$ is $C_{1-2}$alkyl or $C_{1-2}$alkoxy. Even more preferably, it is $R_{7d}$, where $R_{7d}$ is methyl or ethyl. Most preferably, $R_7$ is methyl.

$R_8$ is preferably $R_{8a}$, where $R_{8a}$ is hydrogen, methyl, ethyl, unsubstituted phenyl or phenyl substituted by one or two substituents selected from chlorine, methyl, methoxy and acetamido; or 1- or 2-naphthyl. More preferably, it is $R_{8b}$, where $R_{8b}$ is hydrogen or phenyl, which is unsubstituted or monosubstituted by chlorine, methyl or methoxy. Even more preferably, it is $R_{8c}$, where $R_{8c}$ is hydrogen or phenyl. Most preferably $R_8$ is hydrogen.

$R_9$ is preferably $R_{9a}$, where $R_{9a}$ is $C_{1-2}$alkyl, phenyl or phenyl substituted by one or two groups selected from chlorine, methyl, methoxy and acetamido. More preferably it is $R_{9b}$, where $R_{9b}$ is $C_{1-2}$alkyl, phenyl or phenyl monosubstituted by chlorine, methyl or methoxy. Even more preferably it is $R_{9c}$, where $R_{9c}$ is phenyl or phenyl monosubstituted by methyl. Most preferably $R_9$ is unsubstituted phenyl.

$R_5$ and $R_6$ are preferably $R_{5a}$ and $R_{6a}$, where $R_{5a}$ and $R_{6a}$, independently, are hydrogen, $-COR_{7b}$, $-CONHR_{8b}$ or $-SO_2R_{9b}$. More preferably they are $R_{5b}$ and $R_{6b}$, where $R_{5b}$ and $R_{6b}$, independently, are hydrogen, $-COR_{7c}$, $-CONHR_{8c}$ or $-SO_2R_{9c}$. Even more preferably they are $R_{5c}$ and $R_{6c}$, where $R_{5c}$ and $R_{6c}$, independently, are $-COR_{7d}$ or $-CONH_2$. Most preferably $R_5$ and $R_6$ are $R_{5d}$ and $R_{6d}$, where $R_{5d}$ and $R_{6d}$ are $-COR_{7d}$, especially $-COCH_3$.

When in a complex of formula I $R_5$ and $R_6$ have these preferred significances, the above proviso with respect to $R_1-R_4$ and $R_6$ when are hydrogen also applies. Preferably, when both $R_{5b}$ and $R_{6b}$ are hydrogen, then both $R_1$ and $R_2$ are hydrogen and both $R_2$ and $R_4$ are chlorine.

Preferred 1:2 metal complexes correspond to formula Ia,

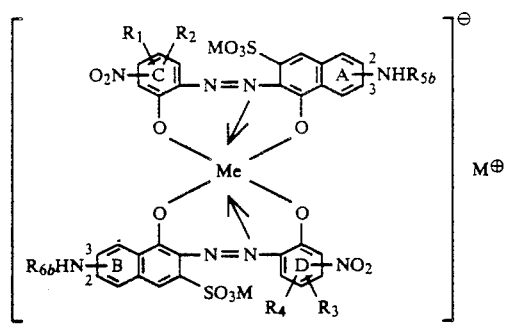

which complexes are in free acid or salt form, in which $R_1$ and $R_3$ are identical and are in the same positions of rings C and D, respectively, including the position of the nitro group already present on the same ring; furthermore, $R_1$ and $R_3$ when being nitro are in the meta to the nitro group already present on the same ring, $R_2$ and $R_4$ are also identical and are in the same position of each of the rings C and D, $R_{5b}$ and $R_{6b}$ are identical and groups —$NHR_{5b}$ and —$NHR_{6b}$, independently, are bound in 2- or 3-position of each of the rings A and B;

provided that when both $R_{5b}$ and $R_{6b}$ are hydrogen, then $R_1$ and $R_3$ must both be hydrogen and $R_2$ and $R_4$ both chlorine.

More preferred are complexes of formula Ia, in which (1) $R_{5b}$ and $R_{6b}$ are $R_{5c}$ and $R_{6c}$ which are identical; and in which each of —$NHR_{5c}$ and —$NHR_{6c}$, independently, is in the 2- or 3-position of rings A and B, respectively;

(2) $R_{5b}$ and $R_{6b}$ are $R_{5d}$ and $R_{6d}$ which are identical; and in which each of —$NHR_{5d}$ and —$NHR_{6d}$, independently, is in the 2- or 3-position of rings A and B, respectively;

(3) $R_{5b}$ and $R_{6b}$ are —$COCH_3$ and each of the —NHCOCH$_3$ groups, independently, is in the 2- or 3-position of rings A and B, respectively;

(4) those of (3), in which each of the —NHCOCH$_3$ groups is in the 3-position of rings A and B, respectively;

(5) those of (3) or (4), in which Me is chromium;

(6) those of (5), in which $R_2$ and $R_4$ are hydrogen.

The invention further provides a process for the production of the 1:2 metal complexes of formula I comprising reacting the 1:1 metal complex of a compound of formula II,

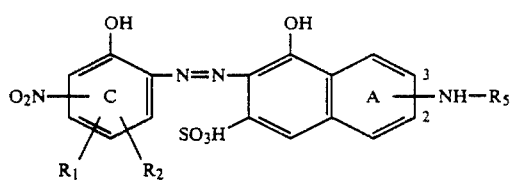

in which the symbols are as defined above, with a metal-free compound of formula III,

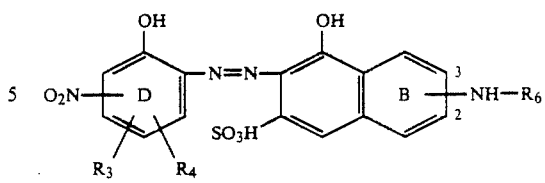

in which the symbols are as defined above, or reacting the 1:1 metal complex of a compound of formula III with a metal-free compound of formula II.

Symmetrical 1:2 metal complexes of formula I are obtained by reacting the appropriate amount of a metal-free compound of formula II or III with a metal-donating compound.

Suitable metal-donating compounds are the conventionally used chromium(III) or cobalt(III) salts. Metallisation (to produce 1:1 and 1:2 complexes) is carried out in accordance with known methods. For the production of symmetrical 1:2 metal complexes the quantity of the metal donating compound is selected in such a way that at least one atom of metal is available for two molecules of a compound of formula II or III.

For example, the preferred chroming reaction to produce symmetrical 1:2 chromium complexes of formula I is preferably carried out in an organic solvent miscible with water, such as formamide, glycerin or ethylene glycol, in water or in a mixture of the above solvents with water. It is recommended that the reaction be carried out at a pH greater than 4, i.e., under slightly acid, neutral or alkaline conditions. The conversion of the monoazo compound into the chromium complex is advantageously carried out at a temperature within the range of 80° to 135° C. or at the boiling point of the reaction mixture, either under atmospheric or super-atmospheric pressure.

Isolation of the final product is carried out in conventional manner. Solutions of the metal complex in organic solvents are diluted with water. From the aqueous solution the metal complex is precipitated by cooling, possibly with the addition of salts. Subsequently, the product is separated by filtration, followed by drying and grinding to a powder, if desired.

Depending on the reaction and isolation conditions the 1:2 metal complexes according to the invention are obtained in free acid form or preferably in salt form with respect to the cation neutralising the chromophoric complex anion and also to the cation neutralising the sulphonic acid groups and any further anionic groups present. The cation neutralising the complex anion is not critical and may be any of those non-chromophoric cations common in the field of anionic metal complex dyestuffs. Examples of suitable cations are alkali metal cations and unsubstituted or substituted ammonium ions, such as lithium, sodium, potassium, ammonium, mono-, di-, tri- and tetramethylammonium, triethylammonium, mono-, di- and triethanol ammonium and mono-, di- and triisopropanolammonium. The preferred cations are the alkali metal cations and ammonium, with sodium being the most preferred.

Likewise, the sulphonic acid groups and any other anionic groups are preferably in salt form. Suitable cations are those mentioned as cations neutralising the complex anion. Generally, all cations present in a 1:2 metal complex of formula I may be the same or different; preferably, they are identical, with sodium being the most preferred cation.

The monoazo compouds of formulae II and III used as starting materials are known or may be prepared in accordance with known methods from available starting materials.

The 1:2 metal complexes of formula I according to the invention are readily soluble in water and are suitable for dyeing or printing various materials, such as natural and synthetic polyamides, for example wool, nylon and leather. They are particularly suitable for dyeing artificially produced oxide layers on the surface of metallic aluminum or, aluminum alloys, i.e., layers produced by chemical or preferably anodising processes, preferably in aqueous solutions. The complexes of formula I may also be used in the form of storage-stable liquid dye preparations which may be prepared by dissolving the dyestuff in an organic solvent preferably miscible with water or in a mixture of such solvent with water optionally in the presence of conventional auxiliaries, such as solubilising agents.

The oxide layers on aluminum dyed with the complexes of formula I show high resistance to heat (as tested during two hours at 250° C.) and good light fastness and do not show any bleeding.

Furthermore, the complexes according to the invention give highly stable dyebaths and have a high absorption rate. During the dyeing process they are not or only slightly sensitive to aluminum ions and sodium sulphate.

By oxide layers produced by anodising processes is meant porous layers of aluminum oxide adhering firmly to the base metal, such as those produced by electrochemical treatment of the aluminum surface in an electrolyte-containing water and a suitable acid, using direct current with the aluminum workpiece forming the anode.

In the field of surface treatments for aluminum, coloured oxide layers produced by anodisation play an important part owing to their exceptional resistance to mechanical damage and corrosion. In order to produce coloured oxide layers conventional processes may be used. Advantageously, dyeing is effected in accordance with the adsorptive dyeing process, a method by which the anodised aluminum is immersed in an aqueous dyestuff solution. The treatment may be carried out at normal temperatures, i.e., in the range between room temperature and the boiling point. Temperatures between 55° and 65° C. are particularly favourable. The pH is so chosen that the oxide layer is either not attacked or only slightly attacked, i.e., dyeing is suitably carried out in the pH range of 3 to 8, preferably in the pH range of 4.5 to 6. Adjustment and maintenance of the pH may be achieved by the addition of usual acids and bases, such as sulphuric acid, acetic acid and sodium hydroxide solution. If required, other additives generally used to improve the coloration process, such as equalising additives, buffer reagents and organic solvents miscible with water may be used.

The dyestuff concentration and time of treatment may be varied over a wide range, according, among other factors, to the required intensity of the dye shade, the thickness and structure of the oxide layer, as well as the other dyeing conditions. The preferred concentration range is from 0.01 to 10 grams per liter. The preferred treatment time is from 1 to 30 minutes, a treatment time of 15 to 20 minutes being particularly suitable.

By aluminum is meant not only pure aluminum, but also those aluminum alloys which behave in a similar manner to the pure metal with regard to anodic oxidation, such as alloys of the type Al/Mg, Al/Si, Al/Mg/Si, Al/Zn/Mg, Al/Cu/Mg and Al/Zn/Mg/Cu. As electrolytes for the anodising process, chromic, oxalic and sulphuric acids can be used, among others, as well as mixtures of oxalic and sulphuric acids. The direct current sulphuric acid process is the most preferred anodising method.

The process may also be carried out in such a manner that dyeing occurs at the same time as the anodic production of the oxide layer or so that the 1:2 metal complex of formula I is actually prepared in the dyebath.

The 1:2 metal complexes of formula I are also suitable for the coloration of chemically produced oxide layers on aluminum, the so-called conversion layers as produced, for example, by the effect of acid or alkaline baths containing the salts of chromic acid.

After dyeing, the coloured oxide layer is processed in the usual manner. A particularly advantageous method is the sealing of the oxide layer by treatment with boiling water or steam, optionally in the presence of an agent which aids sealing and at the same time inhibits bleeding of the dyestuff, such as nickel or cobalt acetate.

The following Examples further serve to illustrate the invention. In the Examples all parts and percentages are by weight and the temperatures are given in degrees centigrade unless otherwise stated.

EXAMPLE 1

23.9 Parts of 2-amino-8-hydroxynaphthalene-6-sulphonic acid (=$\gamma$-acid) are dissolved in 200 parts of water and 7 parts of sodium carbonate. 12 Parts of acetic anhydride are added dropwise at 40°. The pH is maintained at 5 to 6 by adding 10% sodium carbonate solution simultaneously. The resulting solution of N-acetyl-$\gamma$-acid is cooled to 0°–3°, and the pH is adjusted to 11–12.5 by the addition of sodium hydroxide solution.

In the meantime 16.9 parts of 1-amino-2-hydroxy-5-nitrobenzene are diazotised in conventional manner. The thus obtained suspension of the diazonium salt is gradually added to the solution of N-acetyl-$\gamma$-acid. During the coupling reaction, the pH is maintained at 11–12.5 by the dropwise addition of sodium hydroxide solution.

In order to prepare the 1:2 metal complex the resulting red-violet solution is neutralised (pH 6–7) by the addition of acetic acid. 11.5 Parts of chromium(III) acetate and 30 parts sodium acetate are added. The mixture is heated to 98°–100° and then the reaction starts to form the black metal complex dyestuff. After stirring for 16 hours at 95° the dyestuff is salted out by the addition of 10% sodium chloride solution. The product is separated by filtration, washed with 10% sodium chloride solution and dried at 100°. The dyestuff thus obtained corresponds to the formula

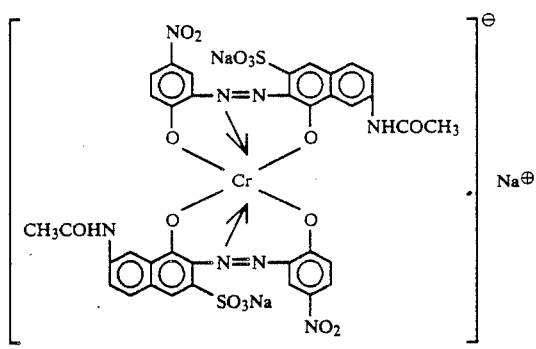

and is a black powder which dissolves in water forming a bluish-black solution. It dyes anodically oxidised aluminum in pure black shades. The dyeing is resistant to heat for two hours at 250°, by this treatment the colour shade does not fade notably. Furthermore; the dyeing has high fastness to light.

EXAMPLES 2-55

By analogy with the method described in Example 1 further 1:2 metal complexes of formula I may be prepared. They contain as chromophore a compound of formula IV

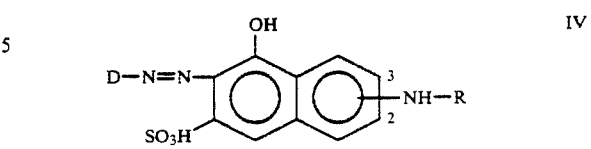

the symbols of which are listed in the following Table. The two compounds of formula IV which are reacted with the metal-donating compound (the corresponding metal is given in an extra column of the Table) are in most cases identical, i.e., symmetrical 1:2 metal complexes are obtained. Only for a few dyestuff examples a 1:1 mixture of compounds of formula IV is used which compounds differ in the position of the —NHR group.

In the last column of the Table the shade of the aluminum dyeing is given, where

| a is black | c is bluish-black |
|---|---|
| b is reddish-black | d is brownish-black. |

The dyeings on anodically oxidised aluminum obtained with the dyestuffs of Examples 2 to 55 are resistant to heat and have good fastness to light.

TABLE

| Ex. No. | D | R | position of —NHR | Me | shade of Al dyeing |
|---|---|---|---|---|---|
| 2 | $O_2N$-phenol(OH)-(NO$_2$) | —COCH$_3$ | 2 | Cr | a |
| 3 | " | " | 3 | Cr | a |
| 4 | " | " | 3 | Co | d |
| 5 | " | " | 2 | Co | d |
| 6 | " | —SO$_2$—C$_6$H$_5$ | 2 | Cr | c |
| 7 | " | " | 3 | Cr | a |
| 8 | " | —SO$_2$—C$_6$H$_4$—CH$_3$ | 2 | Cr | c |
| 9 | " | " | 2 | Co | c |
| 10 | " | " | 3 | Cr | a |
| 11 | " | —CONH$_2$ | 3 | Cr | a |
| 12 | " | —CONH—C$_6$H$_5$ | 3 | Cr | a |
| 13 | " | " | 3 | Co | a |
| 14 | " | —COOC$_2$H$_5$ | 3 | Cr | a |
| 15 | " | —COOCH$_3$ | 2 | Cr | c |
| 16 | " | —COCH$_3$ | 50% 2, 50% 3 | Cr | a |

TABLE-continued

| Ex. No. | D | R | position of —NHR | Me | shade of Al dyeing |
|---|---|---|---|---|---|
| 17 | " | " | " | Co | a |
| 18 | " | —COC$_2$H$_5$ | 3 | Cr | a |
| 19 | 2-methyl-4-nitrophenol (OH, Me, NO$_2$) | —COCH$_3$ | 2 | Cr | a |
| 20 | " | " | 3 | Co | a |
| 21 | " | —SO$_2$—C$_6$H$_5$ | 2 | Cr | b |
| 22 | " | " | 3 | Cr | b |
| 23 | 2-methyl-4-nitrophenol | —COOC$_2$H$_5$ | 3 | Cr | a |
| 24 | " | —COC$_2$H$_5$ | 3 | Cr | a |
| 25 | " | —CONH$_2$ | 3 | Cr | a |
| 26 | " | " | 2 | Cr | a |
| 27 | " | —CONH—C$_6$H$_5$ | 3 | Cr | d |
| 28 | " | " | 3 | Co | d |
| 29 | " | —COCH$_3$ | {50% 2, 50% 3} | Cr | a |
| 30 | 2-chloro-6-methyl-4-nitrophenol (Cl, OH, Me, NO$_2$) | H | " | Cr | a |
| 31 | " | H | 2 | Cr | a |
| 32 | " | H | 3 | Cr | a |
| 33 | " | H | 3 | Co | a |
| 34 | " | H | 2 | Co | a |
| 35 | " | —COCH$_3$ | 3 | Cr | a |
| 36 | " | " | 2 | Cr | a |
| 37 | 2-hydroxy-3-methyl-5-nitrobenzenesulfonic acid (HO$_3$S, OH, Me, NO$_2$) | —COC$_2$H$_5$ | 2 | Cr | a |
| 38 | " | " | 3 | Cr | a |
| 39 | " | —COCH$_3$ | 3 | Cr | a |
| 40 | " | " | 2 | Cr | a |
| 41 | " | —CONH$_2$ | 3 | Cr | a |
| 42 | " | " | 3 | Co | a |

TABLE-continued

| Ex. No. | D | R | position of —NHR | Me | shade of Al dyeing |
|---|---|---|---|---|---|
| 43 | O₂N, OH, CH₃, SO₃H (substituted benzene) | —COCH₃ | 2 | Cr | a |
| 44 | " | " | 3 | Cr | a |
| 45 | " | —COC₂H₅ | 2 | Cr | a |
| 46 | " | " | 3 | Cr | c |
| 47 | " | " | 3 | Co | c |
| 48 | " | " | 2 | Co | a |
| 49 | " | —SO₂—C₆H₅ | 3 | Cr | a |
| 50 | OH, CH₃, O₂N (substituted benzene) | " | 2 | Cr | a |
| 51 | " | —COCH₃ | 3 | Cr | a |
| 52 | " | " | 2 | Cr | a |
| 53 | " | —CONH₂ | 3 | Cr | a |
| 54 | " | " | 3 | Co | a |
| 55 | " | —CONH—C₆H₅ | 3 | Cr | a |

In accordance with the method as described the 1:2 metal complexes of Examples 2 to 55 like the complex of Example 1 are obtained in sodium salt form. They may be converted into other salt forms or even mixed salt forms containing one or more cations indicated in the description above in accordance with known methods.

EXAMPLE 56

44.0 Parts of the monoazo dyestuff obtained from diazotised 1-amino-2-hydroxy-5-nitrobenzene and 2-acetamido-8-hydroxynaphthalene-6-sulphonic acid are converted into the 1:2 chromium complex according to the method described in Example 1 and the chromium complex is separated by filtration. The wet filtercake is dissolved at room temperature in a mixture of 19 parts of crystalline sodium acetate, 30 parts of water and 115 parts of diethylene glycol monoethyl ether. 240 Parts of a stable liquid homogeneous dyestuff preparation are obtained. Such preparation does not show any precipitation of dyestuff after prolonged storage at temperatures below 0° and gives a clear solution in a matter of seconds when added to water.

In the following examples the application of the 1:2 metal complexes of this invention is illustrated.

APPLICATION EXAMPLE A

A degreased and deoxidised workpiece of pure aluminum is anodically oxidised for 30 minutes at a temperature of 18° to 20° with a potential of 15 to 16 volts and with a direct current of density 1.5 amperes/dm² in an aqueous solution containing 18 to 22 parts sulphuric acid and 1.2 to 7.5 parts of aluminum sulphate per 100 parts. An oxide layer of approximately 12μ thickness is obtained.

After rinsing with water, the workpiece is immersed for a period of 15 minutes at 60° in a solution containing 5 parts of the chromium complex produced in accordance with Example 1 in 1000 parts of deionised water the pH of which is adjusted to ca 5.5 by means of acetic acid and sodium acetate. The dyed workpiece is rinsed with water and then sealed in deionised water for 30 minutes at 98° to 100°. A pure black coloration is obtained having good resistance to heat and also to fading on exposure to light.

If the sealing is carried out under otherwise identical conditions in a solution containing 3 parts of nickel acetate in 1000 parts of water, a coloration of comparable quality is obtained.

APPLICATION EXAMPLE B

10 Parts of the dyestuff produced according to Example 1 are dissolved in 500 parts of water and stirred to form a highly viscous mixture with a solution comprising 400 parts of water and 100 parts of methylcellulose of a medium degree of polymerisation and 1.5 degrees substitution. The printing ink so obtained is applied by a silk-screen process to a dry oxidised aluminum sheet obtained by anodising an aluminum alloy of the type Al/Mg/Si (0.5) for 30 minutes in a solution of 100 parts of chromic anhydride in 1000 parts of water at 53° and a current density of 1.2 amperes/dm². The printed aluminum alloy sheet is immersed in boiling water for 10 minutes and then rinsed thoroughly in cold water. A black pattern on a pale greyish background is obtained.

Similarly, the complexes of Examples 2 to 55 may be employed in accordance with Application Example A or B; for the process of Application Example A it is also possible to employ a liquid dye preparation of the dyestuffs of Examples 1 to 55 (according to Example 56).

What is claimed is:

1. A process for dyeing an artificially produced porous oxide layer on an aluminum or aluminum alloy substrate comprising contacting an aluminum or aluminum alloy substrate having an artifically produced porous oxide layer thereon with a solution of a complex of the formula

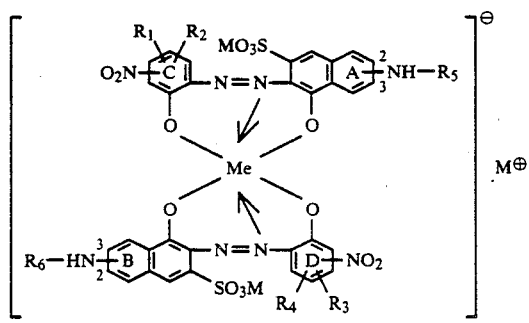

or a mixture thereof, wherein
each of $R_1$ and $R_3$ is independently hydrogen or nitro, with the proviso that when a ring has two nitro groups, they are meta to each other,
each of $R_2$ and $R_4$ is independently hydrogen, chloro or —$SO_3M$,
each of $R_5$ and $R_6$ is independently —$COR_7$, —$CONHR_8$ or —$SO_2R_9$, wherein
$R_7$ is $C_{1-6}$alkyl, $C_{1-6}$alkoxy, phenyl($C_{1-4}$-alkyl) or phenyl($C_{1-4}$alkyl) the phenyl group of which is substituted by 1 or 2 substituents selected from halo, $C_{1-4}$-alkyl, $C_{1-4}$alkoxy, nitro, amino, —COOM, —$SO_3M$ and acetamido,
$R_8$ is hydrogen; $C_{1-6}$alkyl; phenyl; phenyl substituted by 1 or 2 substituents selected from halo, $C_{1-4}$alkyl, $C_{1-4}$alkoxy, nitro, amino, —COOM, —$SO_3M$ and acetamido; naphthyl or naphthyl monosubstituted by chloro, amino, phenylamino, acetamido, benzamido or —$SO_3M$, and
$R_9$ is $C_{1-6}$alkyl, phenyl or phenyl substituted by 1 or 2 substituents selected from halo, $C_{1-4}$alkyl, $C_{1-4}$alkoxy, nitro, amino, —COOM, —$SO_3M$ and acetamido, and Me is chromium or cobalt, wherein each M and $M^{\oplus}$ is independently hydrogen or a non-chromophoric cation,
with the proviso that the —$NHR_5$ group is in the 2- or 3-position of Ring A and the —$NHR_6$ group is in the 2- or 3-position of Ring B, whereby said substrate is dyed.

2. A process according to claim 1 comprising contacting an aluminum or aluminum alloy substrate having an artifically produced porous oxide layer thereon with a solution of a complex of the formula

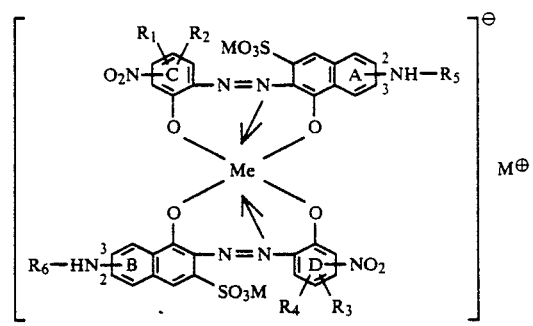

or a mixture thereof, having a concentration of 0.01–10 grams/liter of said complex or mixture of complexes at a pH of 3–8 and a temperature ranging from room temperature to the boiling point of the solution for 1 to 30 minutes and subsequently sealing the dyed substrate.

3. A process according to claim 1 comprising contacting an aluminum or aluminum alloy substrate having an artifically produced porous oxide layer thereon with a solution of a complex of the formula

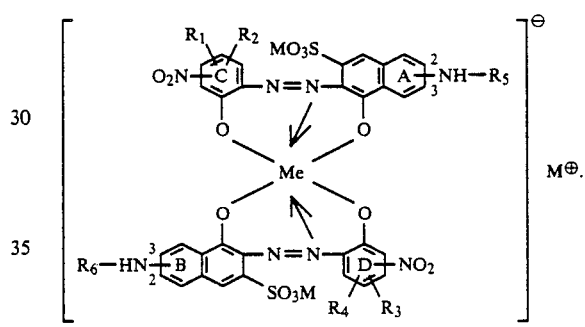

4. A process according to claim 3 wherein
each of $R_5$ and $R_6$ is independently —$COR_{7b}$, —$CONHR_{8b}$ or —$SO_2R_{9b}$, wherein
$R_{7b}$ is $C_{1-2}$alkyl, $C_{1-2}$alkoxy, phenyl($C_{1-2}$-alkyl) or phenyl($C_{1-2}$alkyl) the phenyl group of which is monosubstituted by chloro, methyl or methoxy,
$R_{8b}$ is hydrogen, phenyl or phenyl monosubstituted by chloro, methyl or methoxy, and
$R_{9b}$ is $C_{1-2}$alkyl, phenyl or phenyl monosubstituted by chloro, methyl or methoxy.

5. A process according to claim 4 wherein
each of $R_5$ and $R_6$ is independently —$COR_{7c}$, —$CONHR_{8c}$ or —$SO_2R_{9c}$, wherein
$R_{7c}$ is $C_{1-2}$alkyl or $C_{1-2}$alkoxy,
$R_{8c}$ is hydrogen or phenyl, and
$R_{9c}$ is phenyl or methylphenyl.

6. A process according to claim 5 wherein
each of $R_5$ and $R_6$ is independently —$COR_{7d}$ or —$CONH_2$, wherein $R_{7d}$ is methyl or ethyl.

7. A process according to claim 3 wherein $R_5$ and $R_6$ are identical.

8. A process according to claim 3 wherein
each M and $M^{\oplus}$ is independently hydrogen, lithium, sodium, potassium, ammonium, methylammonium, dimethylammonium, trimethylammonium, tetramethylammonium, triethylammonium, ethanolammonium, diethanolammonium, triethanolammonium, isopropanolammonium, diisopropanolammonium or triisopropanolammonium.

9. A process according to claim 8 wherein
each M and M⊕ is independently hydrogen, lithium, sodium, potassium or ammonium.

10. A process according to claim 9 wherein
each M and M⊕ is lithium, sodium, potassium or ammonium, each M and M⊕ being identical.

11. A process according to claim 10 wherein
each M and M⊕ is sodium.

12. A process according to claim 3 wherein
Rings C and D are identical.

13. A process according to claim 12 wherein the complex is a complex of the formula

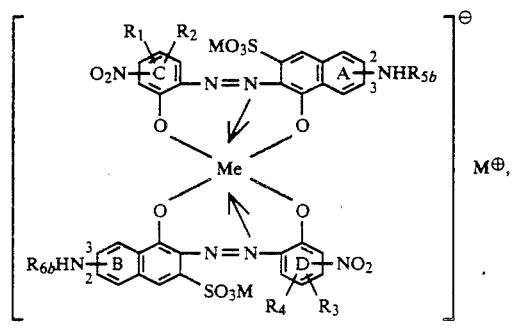

wherein
each of $R_1$ and $R_3$ is hydrogen or nitro, with the proviso that when a ring has two nitro groups, they are meta to each other,
each of $R_2$ and $R_4$ is hydrogen, chloro or —SO$_3$M,
each of $R_{5b}$ and $R_{6b}$ is —COR$_{7c}$, —CONHR$_{8c}$ or —SO$_2$R$_{9c}$, wherein
$R_{7c}$ is $C_{1-2}$alkyl or $C_{1-2}$alkoxy,
$R_{8c}$ is hydrogen or phenyl, and
$R_{9c}$ is phenyl or methylphenyl, and
Me is chromium or cobalt, wherein each M and M⊕ is independently hydrogen or a non-chromophoric cation,
with the provisos that (1) the —NHR$_{5b}$ group is in the 2- or 3-position of Ring A and the —NHR$_{6b}$ group is in the 2- or 3-position of Ring B, (2) Rings C and D are identical, and (3) $R_{5b}$ and $R_{6b}$ are identical.

14. A process according to claim 13 wherein
each of $R_{5b}$ and $R_{6b}$ is —COR$_{7d}$ or —CONH$_2$, wherein $R_{7d}$ is methyl or ethyl.

15. A process according to claim 14 wherein
each of $R_{5b}$ and $R_{6b}$ is —COR$_{7d}$, wherein $R_{7d}$ is methyl or ethyl.

16. A process according to claim 15 wherein
each of $R_{5b}$ and $R_{6b}$ is —COCH$_3$, with the proviso that each —NHCOCH$_3$ group is in the 3-position of the ring to which it is attached.

17. A process according to claim 16 wherein
Me is chromium.

18. A process according to claim 17 wherein
each of $R_2$ and $R_4$ is hydrogen.

19. A process according to claim 18 wherein the complex is the complex of the formula

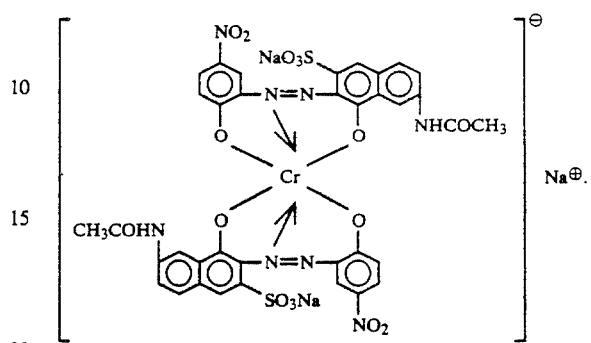

20. A process according to claim 18 wherein the complex is the complex of the formula

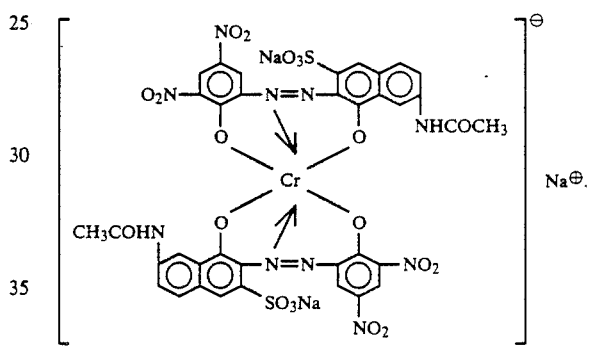

21. A process according to claim 15 wherein the complex is the complex of the formula

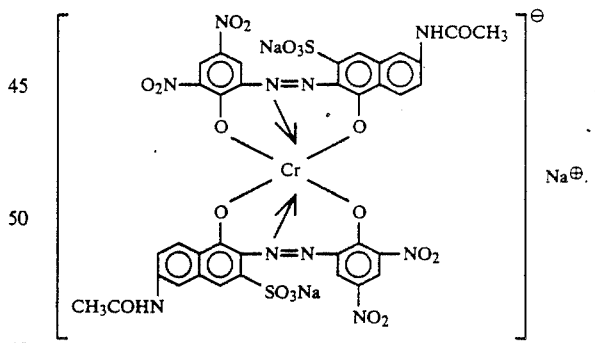

* * * * *